US011724734B2

United States Patent
Xia et al.

(10) Patent No.: US 11,724,734 B2
(45) Date of Patent: Aug. 15, 2023

(54) FULL-HYDRAULIC SYNCHRONOUS STEERING SYSTEM FOR LOW-SPEED HEAVY-LOAD VEHICLE AND CONTROL METHOD THEREOF

(71) Applicant: HEFEI UNIVERSITY OF TECHNOLOGY, Hefei (CN)

(72) Inventors: Guang Xia, Hefei (CN); Peng Shi, Hefei (CN); Yang Zhang, Hefei (CN); Liping Xu, Hefei (CN); Mingzhuo Zhao, Hefei (CN); Jun Gao, Hefei (CN); Meng Yang, Hefei (CN); Shaojie Wang, Hefei (CN); Baoqun Sun, Hefei (CN)

(73) Assignee: HEFEI UNIVERSITY OF TECHNOLOGY, Hefei (CN)

( * ) Notice: Subject to any disclaimer, the term of this patent is extended or adjusted under 35 U.S.C. 154(b) by 198 days.

(21) Appl. No.: 17/473,950

(22) Filed: Sep. 13, 2021

(65) Prior Publication Data
US 2021/0404488 A1 Dec. 30, 2021

Related U.S. Application Data

(63) Continuation of application No. PCT/CN2019/083785, filed on Apr. 23, 2019.

(30) Foreign Application Priority Data

Mar. 13, 2019 (CN) .................. CN201910190247

(51) Int. Cl.
*B62D 5/08* (2006.01)
*B62D 5/065* (2006.01)
*B62D 5/093* (2006.01)

(52) U.S. Cl.
CPC ............... *B62D 5/08* (2013.01); *B62D 5/065* (2013.01); *B62D 5/093* (2013.01)

(58) Field of Classification Search
CPC ........... B62D 5/065; B62D 5/08; B62D 5/093
(Continued)

(56) References Cited

U.S. PATENT DOCUMENTS

2005/0224276 A1   10/2005 Sugitani

FOREIGN PATENT DOCUMENTS

| CN | 1257456 A | 6/2000 |
|----|-----------|--------|
| CN | 202783345 U | 3/2013 |

(Continued)

OTHER PUBLICATIONS

International Search Report of PCT/CN2019/08785.
(Continued)

*Primary Examiner* — Minnah L Seoh
*Assistant Examiner* — Felicia L. Brittman
(74) *Attorney, Agent, or Firm* — J.C. Patents (57) ABSTRACT

The present application provides a full hydraulic synchronous steering system for a low-speed heavy-load vehicle, where the system includes: a steering control mechanism and a steering actuator; by determining a desired steering curve between a steering wheel angle and a rear wheel angle, when a steering error exceeds an allowable error, a controller controls the opening and closing of an oil replenishment solenoid valve (5) and an oil discharge solenoid valve (4) to adjust a flow rate of the oil flowing into a steering cylinder (7), so as to ensure that the steering error is within an allowable error range, thereby implementing synchronous steering. A method for manipulating the full hydraulic synchronous steering system is further provided. The full hydraulic synchronous steering system and the method can improve synchronous steering capability of the low-speed
(Continued)

heavy-load vehicle and change a steering ratio, thereby improving safety and direction feeling of a driver.

8 Claims, 4 Drawing Sheets

(58) Field of Classification Search
USPC .......................................................... 180/441
See application file for complete search history.

(56) References Cited

FOREIGN PATENT DOCUMENTS

| CN | 105691447 A | 6/2016 |
| CN | 205661521 U | 10/2016 |
| CN | 106593982 A | 4/2017 |
| CN | 107454881 A | 12/2017 |
| CN | 108146498 A | 6/2018 |
| CN | 108327783 A | 7/2018 |
| CN | 108547821 A | 9/2018 |
| CN | 207945143 U | 10/2018 |
| CN | 208360297 U | 1/2019 |
| EP | 0589036 A1 | 3/1994 |
| EP | 872405 A2 * | 10/1998 | ............. B62D 15/02 |
| JP | H10287252 A | 10/1998 |
| JP | 2007203985 A | 8/2007 |
| RU | 171744 U1 | 6/2017 |

OTHER PUBLICATIONS

First Office Action of the priority Chinese application.
Notice of Allowance of the priority application CN201910190247.7.
First Office Action of the priority Chinese application CN201910190247.7.
"Design and Experimental Study of Electronic Control Synchronous Full Hydraulic Steering System", Machine Tool & Hydraulics, vol. 46, No. 22, Nov. 2018, pp. 30-40.

* cited by examiner

FULL-HYDRAULIC SYNCHRONOUS STEERING SYSTEM FOR LOW-SPEED HEAVY-LOAD VEHICLE AND CONTROL METHOD THEREOF

CROSS-REFERENCE TO RELATED APPLICATIONS

This application is a continuation of International Application No. PCT/CN2019/083785 filed on Apr. 23, 2019, which claims the priority benefit to Chinese application No. 201910190247.7 filed on Mar. 13, 2019, the contents of the above identified applications are hereby incorporated by reference in its entirety.

TECHNICAL FIELD

The present application relates to the field of steering control of a low-speed heavy-load vehicle, and in particular, to a system for the low-speed heavy-load vehicle to complete synchronous steering and a control method thereof.

BACKGROUND

As time advances, an application field of a low-speed heavy-load vehicle such as construction machinery, agricultural machinery and a military vehicle are more and more extensive, and an application environment thereof is also more complicated. Requirements of people for the low-speed heavy-load vehicle have transitioned from functional requirements to requirements of high efficiency, safety, comfort and energy saving. The requirements of steering capability are also increased accordingly.

A hydraulic steering pump of a traditional low-speed heavy-load vehicle may be "inaccurate" due to factors such as a manufacturing error or a mounting error of the hydraulic steering pump and wear during use, that is, the hydraulic steering pump cannot discharge oil liquid at a predetermined discharge capacity, which causes a wheel angle to be inconsistent with a steering wheel angle. For example, in a normal hydraulic steering system, when the wheel angle has been turned to a maximum value, a steering wheel can still slide a distance to a steering side due to presence of leakage, and when returning to a straight line, the steering wheel angle is deflected relative to a previous straight line. Hence, a driver needs to adjust the steering wheel continuously to ensure a predetermined direction when driving, thus direction feeling of the driver is poor, driving difficulty and labor intensity are large, and the safety is greatly reduced.

Meanwhile, since a steering system and other hydraulic systems of many existing low-speed heavy-load vehicles share an oil pump, working interferences will be generated in these systems, thereby reducing working capacity of the hydraulic systems. For example, when a forklift lifts a cargo, work of the steering system may share a part of the oil liquid, and a phenomenon such as slow lifting speed of the cargo may occur, and even that the cargo cannot be lifted. Not only working efficiency is reduced, but also manipulating stability and safety are low, and there is a great danger.

The application of the low-speed heavy-load vehicle is so wide that its safety is unambiguously one of the most interesting problems in the entire low-speed heavy-load vehicle industry, and influence factors which play a decisive role on the safety are steering accuracy and reliability of the vehicle, therefore, a research on the steering reliability should be considered primarily when it comes to improve the active safety technologies of the low-speed heavy-load vehicle.

SUMMARY

In order to avoid defects of the above-mentioned prior art, the present application proposes a full hydraulic synchronous steering system for a low-speed heavy-load vehicle and a control method thereof to enable the low-speed heavy-load vehicle to achieve synchronous steering and change a steering ratio during steering, and thereby improving safety and direction feeling of a driver.

The present application adopts the following technical solutions to solve technical problems.

A full hydraulic synchronous steering system for a low-speed heavy-load vehicle of the present application is characterized by including a steering control mechanism and a steering actuator;

where the steering control mechanism includes: a steering wheel, a controller, a steering wheel angle sensor, and a rear wheel angle sensor;

the steering actuator includes: an oil tank, an oil pump, a load-sensitive solenoid valve, an oil discharge solenoid valve, an oil replenishment solenoid valve, a left-right reversing valve, a steering cylinder, a hydraulic steering pump and an oil discharge throttle valve;

the steering wheel angle sensor is disposed on a drive shaft of the steering wheel, and the steering wheel angle sensor rotates with the steering wheel and is configured to collect a steering wheel angle signal;

the rear wheel angle sensor is disposed on an overhanging section of a left piston rod in a left working chamber of the steering cylinder, and is configured to collect a rear wheel angle signal;

an oil outlet of the left-right reversing valve is connected to the hydraulic steering pump, and an oil inlet of the left-right reversing valve is connected to the load-sensitive solenoid valve through a main oil line and the oil replenishment solenoid valve;

the hydraulic steering pump is connected to the steering wheel through a steering column;

the load-sensitive solenoid valve is disposed on the main oil line, and is located between a branch of the main oil line and the oil pump;

two ends of the oil discharge solenoid valve are connected to an oil outlet of the load-sensitive solenoid valve and the oil tank, respectively;

two ends of the oil discharge throttle valve are connected to the oil tank and an oil outlet of the oil discharge solenoid valve, respectively;

two ends of the oil replenishment solenoid valve are connected to the oil outlet of the load-sensitive solenoid valve and an oil outlet of the hydraulic steering pump, respectively;

when steering, the load-sensitive solenoid valve is opened, the oil pump supplies oil to the hydraulic steering pump, and the controller performs an oil replenishment operation or an oil discharge operation on the steering cylinder according to the steering wheel angle signal and the rear wheel angle signal collected, so as to achieve synchronous steering of a steering wheel angle and a rear wheel angle; and when there is no steering requirement, the load-sensitive solenoid valve is closed to enable the hydraulic steering pump to be closed, and oil liquid is supplied to other hydraulic circuits for usage through an EF port of the load-sensitive solenoid valve.

The full hydraulic synchronous steering system of the present application is also characterized in that:

the load-sensitive solenoid valve is a two-position three-way high-speed switching solenoid valve, and performs an operation according to the steering wheel angle signal, when it is in a center, an A port is normally closed, the EF port is connected, and the EF port is connected to other hydraulic circuits; and the oil discharge solenoid valve and the oil replenishment solenoid valve are both two-position two-way high-speed switching solenoid valves, and are normally closed when it is in a center, and performs opening and closing operations according to an instruction of the controller.

A speed-adjustable throttle valve is mounted in the left-right reversing valve, and is configured to adjust flow rate of the main oil line, an oil replenishment and an oil discharge, and an operation of the left-right reversing valve is controlled by the steering wheel angle signal; and the oil discharge throttle valve is a speed-adjustable throttle valve, and is configured to control the flow rate of the oil discharge, and perform an adjustment operation according to an instruction of the controller.

A control method of the full hydraulic synchronous steering system according to the present application is characterized in that, the control method is performed according to the following steps.

Step 1: determining a desired steering curve $\gamma$ between a steering wheel angle $\alpha$ and a rear wheel angle $\beta$.

Step 2: inputting a current steering wheel angle value $\alpha_1$ to the desired steering curve $\gamma$ to obtain a desired rear wheel angle value $\beta_1$ corresponding to the current steering wheel angle value $\alpha_1$.

Step 3: collecting an actual rear wheel angle value $\beta_2$, and calculating a steering error $|\Delta\beta|=|\beta_2-\beta_1|$.

Step 4: determining an oil supply status of a steering cylinder.

Step 5: performing compensation control of the steering error according to the oil supply status of the steering cylinder.

The control method of the full hydraulic synchronous steering system according to the present application is also characterized in that the desired steering curve $\gamma$ of Step 1 is determined according to the following method.

Step 1.1: determining a relationship curve $\gamma_1$ between the steering wheel angle $\alpha$ and a stroke L of a push rod of the steering cylinder using formula (1):

$$\alpha = \frac{90\pi \times (D^2 - d^2)}{q_0} \times L \tag{1}$$

in formula (1), $q_0$ is a theoretical single-turn discharge of a hydraulic steering pump; D is an inner diameter of the steering cylinder; d is a diameter of the push rod of the steering cylinder.

Step 1.2: obtaining according to a characteristic relationship among the push rod of the steering cylinder, a steering knuckle arm and parameters of a steering column, a steering curve $\gamma_2$ between the stroke L of the push rod of the steering cylinder and the rear wheel angle $\beta$ and determining, according to the steering curve $\gamma_2$, the desired steering curve $\gamma$ between the steering wheel angle $\alpha$ and the rear wheel angle $\beta$.

The desired steering curve $\gamma$ of Step 1 may also be determined according to the following method.

Step 1.1: opening an oil replenishment solenoid valve fully, closing an oil discharge solenoid valve fully, rotating a steering wheel, collecting a steering wheel angle value and a rear wheel angle value, and obtaining a full oil replenishment steering curve $\gamma_3$ between the steering wheel angle $\alpha$ and the rear wheel angle $\beta$.

Step 1.2: closing the oil replenishment solenoid valve fully, opening the oil discharge solenoid valve fully, rotating the steering wheel, collecting the steering wheel angle value and the rear wheel angle value, and obtaining, a full oil discharge steering curve $\gamma_4$ between the steering wheel angle $\alpha$ and the rear wheel angle $\beta$.

Step 1.3: taking any one of curves within a range of upper and lower limits formed by the full oil replenishment steering curve $\gamma_3$ and the full oil discharge steering curve $\gamma_4$ as the desired steering curve $\gamma$ between the steering wheel angle $\alpha$ and the rear wheel angle $\beta$.

The oil supply status of the steering cylinder of Step 4 is determined according to the following method:

when $|\Delta\beta|>\Delta\beta_{limit}$ and $\Delta\beta<0$, the steering cylinder is in an oil replenishment status;

when $|\Delta\beta|>\Delta\beta_{limit}$ and $\Delta\beta>0$, the steering cylinder is in an oil discharge status; and when $|\Delta\beta|\leq\Delta\beta_{limit}$, the steering cylinder is in a balanced status;

where $\Delta\beta_{limit}$ is an allowable error.

The compensation control of the steering error of Step 5 is performed according to the following method:

when the steering cylinder is in the oil replenishment status, opening, an oil replenishment solenoid valve, closing, an oil discharge solenoid valve, and performing an oil replenishment operation on the steering cylinder;

when the steering cylinder is in the balanced status, closing the oil replenishment solenoid valve and closing the oil discharge solenoid valve without controlling the steering cylinder; and when the steering cylinder is in the oil discharge status, closing the oil replenishment solenoid valve, opening the oil discharge solenoid valve, and performing an oil discharge operation on the steering cylinder.

Compared with the prior art, beneficial effects of the present application are as follows.

1. The system and the method in the present application achieve automatic correction of a direction, ensure consistency between the steering wheel angle and a wheel angle, and do not need to correct the steering wheel repeatedly during steering, and do not need to determine repeatedly whether a wheel direction is consistent with the steering wheel, reduce difficulty in driving and labor strength, and improve the safety and the direction feeling of the driver.

2. The system and the method of the present application can change the steering ratio, and achieve different steering ratios by controlling the flow rate of the oil fluid flowing into the steering cylinder, thereby improving flexibility of turning around, and achieving an accurate operation. For example, when a forklift is turning around, the oil fluid flowing into the steering cylinder is increased, and rotating the steering wheel by a smaller amount of turns can achieve the turning around, thereby reducing the labor strength of the driver and improving work efficiency. For another example, when the forklift needs to be forklifted in a narrow and accurate direction, the oil liquid flowing into the steering cylinder can be reduced, rendering a wheel angle corresponding to the same steering wheel angle to be smaller, thereby achieving more accurate work.

3. The load-sensitive solenoid valve in the system and the method of the present application can have good pressure compensation for steering loads, thus a steering circuit and other circuits are not affected, a main flow guarantees the steering circuit preferentially and the system is energy saving; pressure of the steering circuit and the rate of flow are kept preferentially, and the steering is reliable; and a center pressure characteristic is not affected by a discharge.

Reference signs in the figures: 1 oil tank; 2 oil pump; 3 load-sensitive solenoid valve; 4 oil discharge solenoid valve; 5 oil replenishment solenoid valve; 6 left-right reversing valve; 7 steering cylinder; 8 hydraulic steering pump; 9 one way valve; 10 throttle valve; 11 overflow valve; 12 filter; and 13 oil discharge throttle valve.

DESCRIPTION OF EMBODIMENTS

Figure 1:
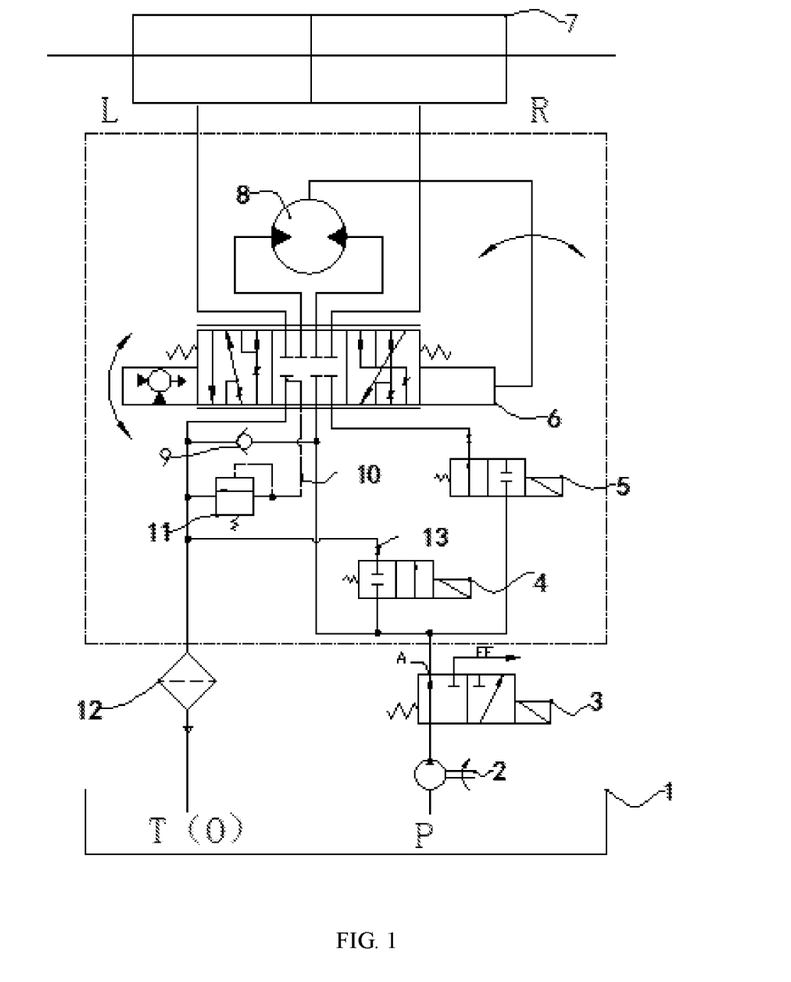
FIG. 1 is a schematic structural diagram of a system according to the present application.

In the present embodiment, a full hydraulic synchronous steering system for a low-speed heavy-load vehicle, as shown in FIG. 1, includes a steering control mechanism and a steering actuator.

The steering control mechanism includes: a steering wheel, a controller, a steering wheel angle sensor, and a rear wheel angle sensor.

The steering actuator includes: an oil tank 1, an oil pump 2, a load-sensitive solenoid valve 3, an oil discharge solenoid valve 4, an oil replenishment solenoid valve 5, a left-right reversing valve 6, a steering cylinder 7, a hydraulic steering pump 8 and an oil discharge throttle valve 13.

The steering wheel angle sensor is disposed on a drive shaft of the steering wheel, and the steering wheel angle sensor rotates with the steering wheel and is configured to collect a steering wheel angle signal, and the collected signal is delivered to the controller in a form of a pulse.

The rear wheel angle sensor is disposed on an overhanging section of a left piston rod in a left working chamber of the steering cylinder 7, and is configured to collect a rear wheel angle signal.

An oil outlet of the left-right reversing valve 6 is connected to the hydraulic steering pump 8, and an oil inlet of the left-right reversing valve is connected to the load-sensitive solenoid valve 3 through a main oil line and the oil replenishment solenoid valve 5. In a specific implementation, a speed-adjustable throttle valve is mounted in the left-right reversing valve 6, and is configured to adjust flow rate of the main oil line, an oil replenishment and an oil discharge. The reversing valve is a three-position eight-way solenoid valve, and an operation thereof is controlled by a steering wheel angle signal. When the steering wheel angle sensor has collected an increasing pulse signal, a wheel is set as turning left, and at this time, the left-right reversing valve 6 moves to a left position. When the steering wheel angle sensor has collected a decreasing pulse signal, the wheel is set as turning right, and at this time, the left-right reversing valve 6 moves to a right position. The left-right reversing valve 6 is kept in a center when there is no steering signal.

The hydraulic steering pump 8 is connected to the steering wheel through a steering column, and an oil outlet is connected to the steering cylinder 7.

The load-sensitive solenoid valve 3 is disposed on the main oil line, and is located between a branch of the main oil line and the oil pump 2. In the present embodiment, the load-sensitive solenoid valve 3 is a two-position three-way high-speed switching solenoid valve, and performs an operation according to the steering wheel angle signal, when it is in the center, an A port is normally closed, an EF port is connected, and the EF port is connected to other hydraulic circuits.

Two ends of the oil discharge solenoid valve 4 are connected to an oil outlet of the load-sensitive solenoid valve 3 and the oil tank 1, respectively; and two ends of the oil replenishment solenoid valve 5 are connected to the oil outlet of the load-sensitive solenoid valve 3 and an oil outlet of the hydraulic steering pump 8, respectively. In the present embodiment, the oil discharge solenoid valve 4 and the oil replenishment solenoid valve 5 are both two-position two-way high-speed switching solenoid valves, and are normally closed when it is in a center, and performs opening and closing operations according to an instruction of the controller.

Two ends of the oil discharge throttle valve 13 are connected to the oil tank 1 and an oil outlet of the oil discharge solenoid valve 4, respectively. The flow rate of the oil discharge may be adjusted through the oil discharge throttle valve 13, and an adjustment operation is performed according to an instruction of the controller.

When steering, the load-sensitive solenoid valve 3 is opened, the oil pump 2 supplies oil to the hydraulic steering pump 8. According to the steering wheel angle signal and the rear wheel angle signal collected, the controller performs an oil replenishment operation or an oil discharge operation on the steering cylinder 7 by opening and closing the oil discharge solenoid valve 4 and the oil replenishment solenoid valve 5, thus a steering error is always within a set error range, so as to achieve synchronous steering of a steering wheel angle and a rear wheel angle; and when there is no steering requirement, the load-sensitive solenoid valve 3 is closed to enable the hydraulic steering pump 8 to be closed, and oil liquid is supplied to other hydraulic circuits for usage through the EF port of the load-sensitive solenoid valve 3.

In the present embodiment, a control method of the full hydraulic synchronous steering system for the low-speed heavy-load vehicle includes the following steps.

Step 1: determine a desired steering curve γ between a steering wheel angle α and a rear wheel angle β. In the present embodiment, there are two methods to determine the desired steering curve.

A First Method

Step 1.1: determine a relationship curve $\gamma_1$ between the steering wheel angle α and a stroke L of a push rod of the steering cylinder using formula (1):

$$\alpha = \frac{90\pi \times (D^2 - d^2)}{q_0} \times L \quad (1)$$

in formula (1), $q_0$ is a theoretical single-turn discharge of the hydraulic steering pump; D is an inner diameter of the steering cylinder 7; d is a diameter of the push rod of the steering cylinder 7.

Step 1.2: obtain according to a characteristic relationship among the push rod of the steering cylinder, a steering knuckle arm and parameters of the steering column, a steering curve $\gamma_2$ between the stroke L of the push rod of the steering cylinder and the rear wheel angle $\beta$, and determine, according to the steering curve $\gamma_2$, the desired steering curve $\gamma$ between the steering wheel angle $\alpha$ and the rear wheel angle $\beta$. In a vehicle steering mechanism, there is a specific connection relationship among the push rod of the steering cylinder, the steering knuckle arm and the parameters of the steering column. After the connection relationship is determined, a relationship between the stroke L of the push rod of the steering cylinder and the rear wheel angle $\beta$ can be determined. By changing a displacement of the push rod of the steering cylinder, a corresponding rear wheel angle value can be obtained, i. e. the steering curve $\gamma_2$ between the stroke L of the push rod of the steering cylinder and the rear wheel angle $\beta$ can be obtained.

A Second Method

Step 1.1: open the oil replenishment solenoid valve 5 fully, close the oil discharge solenoid valve 4 fully, rotate the steering wheel, collect a steering wheel angle value and a rear wheel angle value, and obtain a full oil replenishment steering curve $\gamma_3$ between the steering wheel angle $\alpha$ and the rear wheel angle $\beta$.

Step 1.2: close the oil replenishment solenoid valve 5 fully, open the oil discharge solenoid valve 4 fully, rotate the steering wheel, collect the steering wheel angle value and the rear wheel angle value, and obtain a full oil discharge steering curve $\gamma_4$ between the steering wheel angle $\alpha$ and the rear wheel angle $\beta$.

Step 1.3: take any one of curves within a range of upper and lower limits formed by the full oil replenishment steering curve $\gamma_3$ and the full oil discharge steering curve $\gamma_4$ as the desired steering curve $\gamma$ between the steering wheel angle $\alpha$ and the rear wheel angle $\beta$. Namely, as long as upper and lower peaks of the curve do not exceed the upper and lower limits, the curve can be the desired steering curve $\gamma$. In practice, for simplicity of a calculation, a straight curve within the upper and lower limits is generally selected as the desired steering curve $\gamma$.

Step 2: input a current steering wheel angle value $\alpha_1$ to the desired steering curve $\gamma$ to obtain a desired rear wheel angle value $\beta_1$ corresponding to the current steering wheel angle value $\alpha_1$.

Step 3: collect an actual rear wheel angle value $\beta_2$, and calculating a steering error $|\Delta\beta|=|\beta_2-\beta_1|$.

Step 4: determine an oil supply status of the steering cylinder; where the oil supply status is determined according to the following method:

when $|\Delta\beta|>\Delta\beta_{limit}$ and $\Delta\beta<0$, the steering cylinder is in an oil replenishment status;

when $|\Delta\beta|>\Delta\beta_{limit}$ and $\Delta\beta>0$, the steering cylinder is in an oil discharge status; and when $|\Delta\beta|\leq\Delta\beta_{limit}$, the steering cylinder is in a balanced status.

Step 5: perform compensation control of the steering error according to the oil supply status of the steering cylinder, which specifically includes:

when the steering cylinder is in the oil replenishment status, open the oil replenishment solenoid valve 5, close the oil discharge solenoid valve 4, and perform an oil replenishment operation on the steering cylinder;

when the steering cylinder is in the balanced status, close the oil replenishment solenoid valve 5, close the oil discharge solenoid valve 4 without controlling the steering cylinder; and when the steering cylinder is in the oil discharge status, close the oil replenishment solenoid valve 5, open the oil discharge solenoid valve 4, and perform an oil discharge operation on the steering cylinder.

Figure 2:
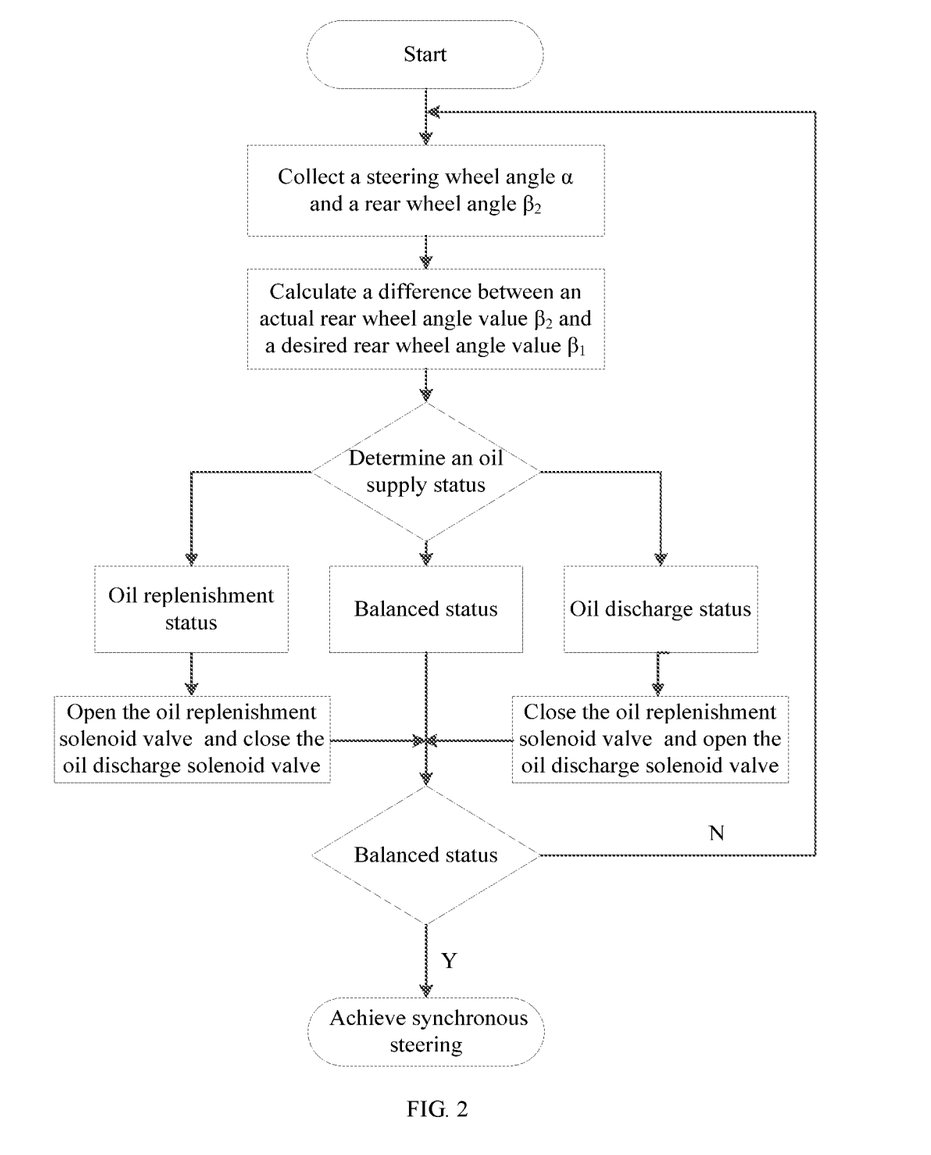
FIG. 2 is a control flowchart according to the present application.

The steering control flow can be summarized as: when steering, a calculation and a comparison are performed according to the collected steering wheel angle signal and the rear wheel angle signal to obtain the steering error, the controller controls the opening and closing of the oil replenishment solenoid valve and the oil discharge solenoid valve according to a difference between the steering error and an allowable error, adjusts the flow rate of the oil replenishment and the oil discharge, thereby adjusting a displacement stroke of a piston of the steering cylinder to achieve accurate synchronous steering, and the control flow thereof is as shown in FIG. 2.

Embodiment 1: in the present embodiment, a steering synchronous control is performed according to the desired steering curve $\gamma$ determined according to the relationship between a pull rod of the steering cylinder 7 and the hydraulic steering pump 8, and a certain type of a 3-ton counterbalanced forklift is taken as an example.

The system and the method for improving synchronous steering capability of the low-speed heavy-load vehicle of the present application are applied to the certain type of the 3-ton counterbalanced forklift, and steering parameters of the counterbalanced forklift are as follows: a diameter d of the push rod of the steering cylinder 7=50 mm, an inner diameter thereof D=70 mm, and a left/right length L of the pull rod of the steering cylinder 7=99.5 mm; a discharge capacity $q_0$ of the hydraulic steering pump 8=100 ml/r; a maximum inner/outer angle is 78°/54°; a flow rate $q_1$=3 L/min when it is selected that both the oil replenishment solenoid valve 5 and the oil discharge solenoid valve 4 are opened fully; and the controller uses MC9S12XS128MAL of Freescale.

Figure 3:
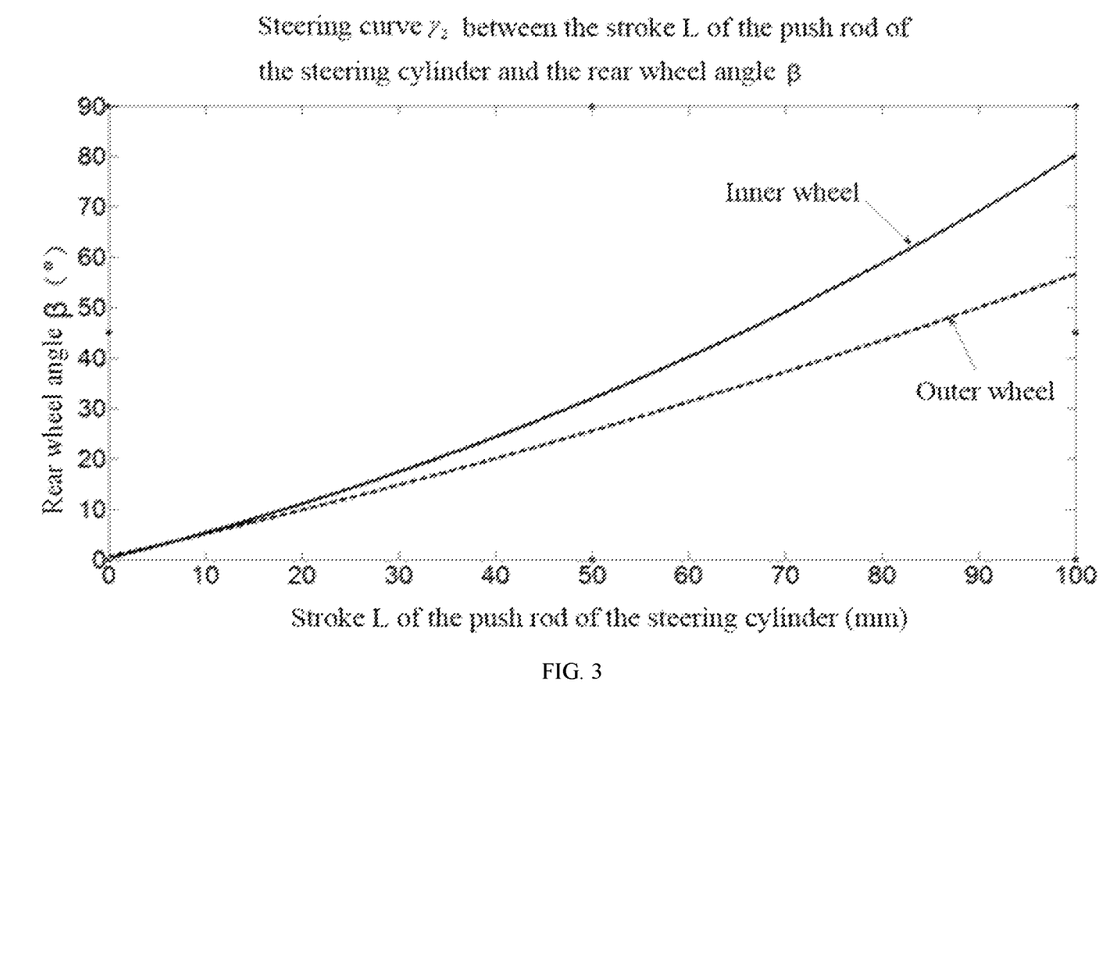
FIG. 3 is a theoretical relationship diagram of a steering cylinder and a rear wheel angle according to the present application.

A relationship between the stroke L of the steering cylinder 7 and the rear wheel angle $\beta$ is as shown in FIG. 3. It can be seen that, the stroke L of the steering cylinder 7 and the rear wheel angle $\beta$ have a one-to-one correspondence relationship, the abscissa is the stroke L of the steering cylinder 7, the ordinate is the rear wheel angle $\beta$, and the relationship between the two is input to the controller.

A steering wheel sensor is disposed on the drive shaft of the steering wheel for collecting the steering wheel angle $\alpha$; a rear wheel angle sensor is disposed on the overhanging section of the pull rod of the steering cylinder 7 for collecting an actual rear wheel angle value $\beta_2$; the load-sensitive solenoid valve 3 is disposed at an oil outlet of the oil pump 2; the oil replenishment solenoid valve 5 and the oil discharge solenoid valve 4 are disposed at the oil outlet of the load-sensitive solenoid valve 3; and lines of the controller are completely connected.

Specific operation principle and process of the controller are as follows: when the steering wheel angle sensor converts an operation signal of the steering wheel into the form of a pulse, one turn of the steering wheel is set to 64 pulses at equal intervals. An initial value of the pulse at the center is $\tau$=1000, the steering wheel turns left to increase the pulse, and turns right to decrease the pulse.

The controller is configured to convert the desired rear wheel angle value $\beta_1$ and the actual rear wheel angle value $\beta_2$ into a form of a counting point, since a maximum voltage of the 16-bit Freescale controller is 5V, and a maximum counting point is 255, the counting point $$\delta = \frac{x \times 255}{5},$$

where x is a voltage value of the rear wheel angle.

A maximum inner angle of the rear wheel is 54°, and a maximum outer angle is 78°, so an angle range is 132°. It is set that the rear wheel angle turns left as negative, and turns right as positive, δ of the center is 124, the rear wheel turns left to decrease, and turns right to increase. It is assumed that a counting point corresponding to the desired rear wheel angle $\beta_1$ is $\delta_0$, and a count point corresponding to the actual rear wheel angle $\beta_2$ is $\delta_1$, $|\Delta\delta|=|\delta_1-\delta_0|$, and $\Delta\beta_{limit}$ is set to 2°, that is, a corresponding $$\Delta\delta_{limit} = \frac{255}{132} \times \Delta\beta_{limit} = 3.86.$$

A process of improving the synchronous steering capability of the forklift is as follows.

Step 1: rotate the steering wheel, and return to a center of the steering wheel to collect the steering wheel angle α=0° and the actual rear wheel angle $\beta_2$=3°.

Step 2: calculate the desired rear wheel angle $\beta_1$, an actual counting point $\delta_1$=132, a desired counting point $\delta_0$=124, and the pulse τ=1000.

Step 3: determine the oil supply status according to a difference of the counting point, $$|\Delta\delta| = |\delta_1 - \delta_0| = 8 > \Delta\delta_{limit} = \frac{255}{132} \times \Delta\beta_{limit} = 3.86,$$

$\Delta\delta=\delta_1-\delta_0=8>0$, therefore the oil supply status is in the oil discharge status at this time.

Step 4: perform oil discharge control, close the oil replenishment solenoid valve 5, and open the oil discharge solenoid valve 4.

During a test, the steering wheel is rotated, and it can be observed that the counting point δ follows well, an error Δδ is always smaller than a set error $\Delta\delta_{limit}$, an error of the counting point Δδ is always within 3, and the steering curve is always fit to the desired steering curve. When the steering wheel is rotated to a limit position, the rear wheel reaches the limit position correspondingly. When the steering wheel is in the center, the rear wheel is also in the center, and at the same time, the pulse does not jump and is not lost. Namely, synchronous steering is achieved. During the operation of the steering system, the oil liquid flows to the steering circuit preferentially, thereby ensuring that the pressure of the steering circuit is reliable, and during no operation, the oil liquid flows to a hydraulic driving circuit such as a fork and a gate frame.

In summary, the system can achieve a function of full hydraulic synchronous steering of the low-speed heavy-load vehicle.

Embodiment 2: in the present embodiment, a steering synchronous control is performed according to the desired steering curve γ determined according to the full oil replenishment steering curve and the full oil discharge steering curve, and the same type of forklift as that in embodiment 1 is taken as an example.

The system and the method for improving synchronous steering capability of the low-speed heavy-load vehicle of the present application are applied to the certain type of the 3-ton counterbalanced forklift. A steering wheel sensor is disposed on the drive shaft of the steering wheel for collecting the steering wheel angle α; a rear wheel angle sensor is disposed on the overhanging section of the pull rod of the steering cylinder 7 for collecting an actual rear wheel angle value $\beta_2$; the load-sensitive solenoid valve 3 is disposed at an oil outlet of the oil pump 2; the oil replenishment solenoid valve 5 and the oil discharge solenoid valve 4 are disposed at the oil outlet of the load-sensitive solenoid valve 3; lines of the controller are completely connected; and the controller uses MC9S12XS128MAL of Freescale.

Specific operation principle and process of the controller are as follows: when the steering wheel angle sensor converts an operation signal of the steering wheel into a form of a pulse, one turn of the steering wheel is set to 64 pulses at equal intervals. An initial value of the pulse at the center is τ=1000, the steering wheel turns left to increase the pulse, and turns right to decrease the pulse.

The controller is configured to convert the desired rear wheel angle value $\oplus_1$ and the actual rear wheel angle value $\beta_2$ into a form of a counting point, since a maximum voltage of the 16-bit Freescale controller is 5V, and a maximum counting point is 255, the counting point $$\delta = \frac{x \times 255}{5},$$

where x is a voltage value of the rear wheel angle.

A maximum inner angle of the rear wheel is 54°, and a maximum outer angle is 78°, so an angle range is 132°. It is set that the rear wheel angle turns left as negative, and turns right as positive, δ of the center is 124, the rear wheel turns left to decrease, and turns right to increase. It is assumed that a counting point corresponding to the desired rear wheel angle $\beta_1$ is $\delta_0$, and a count point corresponding to the actual rear wheel angle $\beta_2$ is $\delta_1$, $|\Delta\delta|=|\delta_1-\delta_0|$, and $\Delta\beta_{limit}$ is set to 2°, that is, a corresponding $$\Delta\delta_{limit} = \frac{255}{132} \times \Delta\beta_{limit} = 3.86.$$

Figure 4:
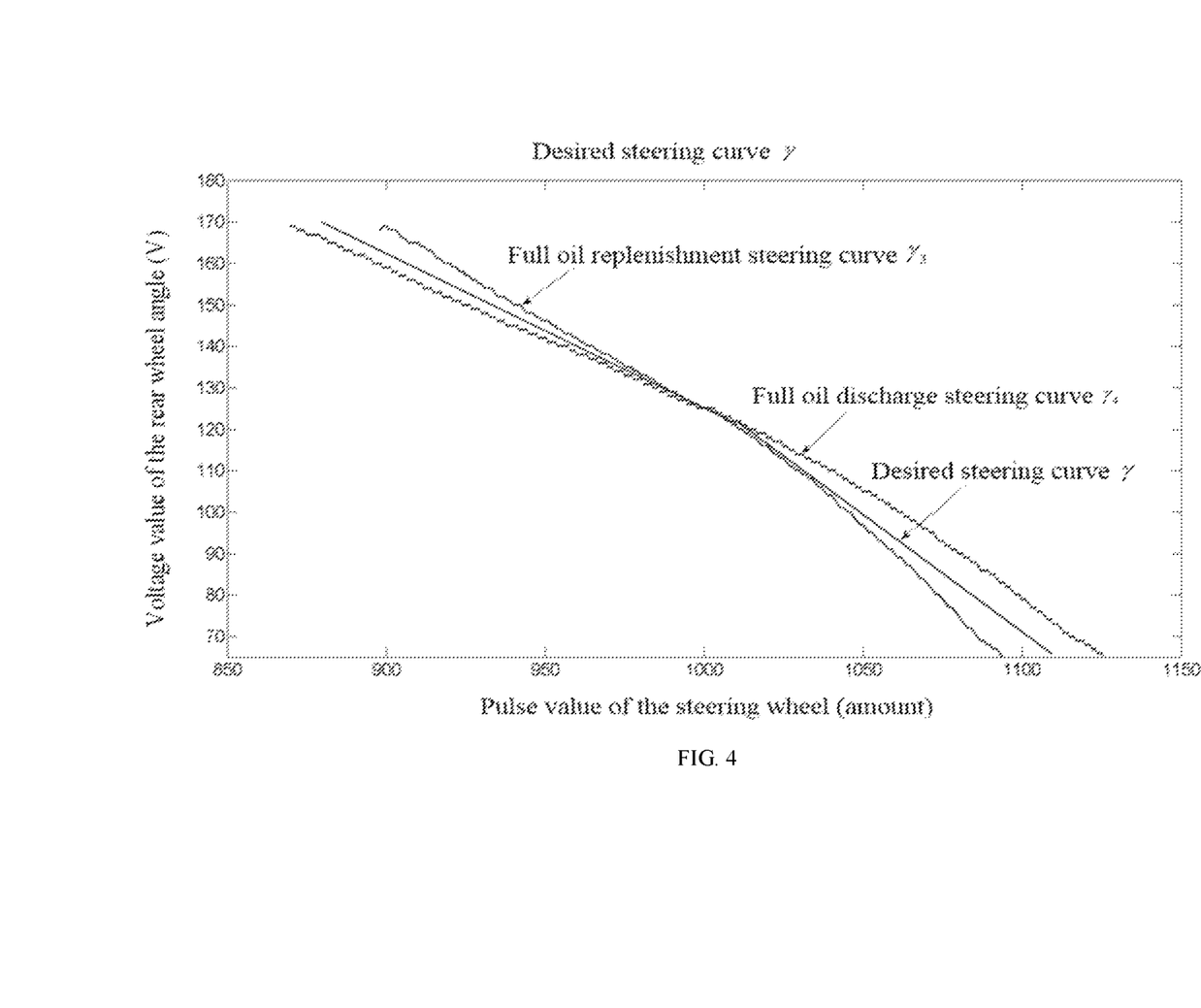
FIG. 4 is a desired steering curve γ determined by a full oil replenishment steering curve $\gamma_3$ and a full oil discharge steering curve $\gamma_4$ according to the present application.

For convenience of a calculation, a polygonal curve is taken as the desired steering curve, as shown in FIG. 4, and a method is taken as follows.

Step 1: rotate the steering wheel to a left limit, acquire a steering wheel angle value $\alpha_A$ and a mean value $\beta_A$ of rear wheel angle values of the full oil replenishment steering curve $\gamma_3$ and the full oil discharge steering curve $\gamma_4$ at this time, and record coordinates of A point as $\alpha_A$ and $\beta_A$.

Step 2: take $\alpha_B$=0, $\beta_B$=0 as coordinate B.

Step 3: rotate the steering wheel to a right limit, acquire a steering wheel angle value $\alpha_C$ and a mean value $\beta_C$ of the rear wheel angle values of the full oil replenishment steering curve $\gamma_3$ and the full oil discharge steering curve $\gamma_4$ at this time, and record coordinates of C point as $\alpha_C$ and $\beta_C$.

Step 4: connect the points A, B, and C in sequence, then taking the polygonal line as the desired steering curve γ.

A process of improving the synchronous steering capability of the forklift is as follows.

Step 1: rotate the steering wheel, and return to a center of the steering wheel to collect the steering wheel angle α=0° and the actual rear wheel angle $\beta_2$=2°.

Step 2: calculate the desired rear wheel angle $\beta_1$, an actual counting point $\delta_1=120$, a desired counting point $\delta_0=124$, and the pulse $\tau=1000$.

Step 3: determine the oil supply status according to a difference of the counting point, $$|\Delta\delta| = |\delta_1 - \delta_0| = 4 > \Delta\delta_{limit} = \frac{255}{132} \times \Delta\beta_{limit} = 3.86,$$

$\Delta\delta=\delta_1-\delta_0=-4<0$, therefore the oil supply status is of the oil replenishment status at this time.

Step 4: perform oil replenishment control, close the oil discharge solenoid valve 4, and open the oil replenishment solenoid valve 5.

During a test, the steering wheel is rotated, and it can be observed that the counting point $\delta$ follows well, an error $\Delta\delta$ is always smaller than a set error $\Delta\delta_{limit}$, an error of the counting point $\Delta\delta$ is always within 3, and the steering curve is always fit to the desired steering curve. When the steering wheel is rotated to a limit position, the rear wheel reaches the limit position correspondingly. When the steering wheel is in the center, the rear wheel is also in the center, and at the same time, the pulse does not jump and is not lost. Namely, synchronous steering is achieved. During the operation of the steering system, the oil liquid flows to the steering circuit preferentially, thereby ensuring that the pressure of the steering circuit is reliable, and during no operation, the oil liquid flows to a hydraulic driving circuit such as a fork and a gate frame.

In summary, the system can achieve a function of full hydraulic synchronous steering of the low-speed heavy-load vehicle.

What is claimed is:

1. A full hydraulic synchronous steering system for a low-speed heavy-load vehicle, comprising a steering control mechanism and a steering actuator;
   wherein the steering control mechanism comprises: a steering wheel, a controller, a steering wheel angle sensor, and a rear wheel angle sensor;
   the steering actuator comprises: an oil tank (1), an oil pump (2), a load-sensitive solenoid valve (3), an oil discharge solenoid valve (4), an oil replenishment solenoid valve (5), a left-right reversing valve (6), a steering cylinder (7), a hydraulic steering pump (8) and an oil discharge throttle valve (13);
   the steering wheel angle sensor is disposed on a drive shaft of the steering wheel, and the steering wheel angle sensor rotates with the steering wheel and is configured to collect a steering wheel angle signal;
   the rear wheel angle sensor is disposed on an overhanging section of a left piston rod in a left working chamber of the steering cylinder (7), and is configured to collect a rear wheel angle signal;
   an oil outlet of the left-right reversing valve (6) is connected to the hydraulic steering pump (8), and an oil inlet of the left-right reversing valve (6) is connected to the load-sensitive solenoid valve (3) through a main oil line and the oil replenishment solenoid valve (5);
   the hydraulic steering pump (8) is connected to the steering wheel through a steering column;
   the load-sensitive solenoid valve (3) is disposed on the main oil line, and is located between a branch of the main oil line and the oil pump (2);
   two ends of the oil discharge solenoid valve (4) are connected to an oil outlet of the load-sensitive solenoid valve (3) and the oil tank (1), respectively;
   two ends of the oil discharge throttle valve (13) are connected to the oil tank (1) and an oil outlet of the oil discharge solenoid valve (4), respectively;
   two ends of the oil replenishment solenoid valve (5) are connected to the oil outlet of the load-sensitive solenoid valve (3) and an oil outlet of the hydraulic steering pump (8), respectively;
   when steering, the load-sensitive solenoid valve (3) is opened, the oil pump (2) supplies oil to the hydraulic steering pump (8), and the controller performs an oil replenishment operation or an oil discharge operation on the steering cylinder (7) according to the steering wheel angle signal and the rear wheel angle signal collected, so as to implement synchronous steering of a steering wheel angle and a rear wheel angle; and
   when there is no steering requirement, the load-sensitive solenoid valve (3) is closed to enable the hydraulic steering pump (8) to be closed, and oil liquid is supplied to other hydraulic circuits for usage through an EF port of the load-sensitive solenoid valve (3).

2. The full hydraulic synchronous steering system according to claim 1, wherein the load-sensitive solenoid valve (3) is a two-position three-way high-speed switching solenoid valve, and performs an operation according to the steering wheel angle signal, when it is in a center, an A port is normally closed, the EF port is connected, and the EF port is connected to other hydraulic circuits; and
   the oil discharge solenoid valve (4) and the oil replenishment solenoid valve (5) are both two-position two-way high-speed switching solenoid valves, and are normally closed when it is in a center, and performs opening and closing operations according to an instruction of the controller.

3. The full hydraulic synchronous steering system according to claim 1, wherein a speed-adjustable throttle valve is mounted in the left-right reversing valve (6), and is configured to adjust the flow rate of the main oil line, an oil replenishment and an oil discharge, and an operation of the left-right reversing valve (6) is controlled by the steering wheel angle signal; and
   the oil discharge throttle valve (13) is a speed-adjustable throttle valve, and is configured to control the flow rate of the oil discharge, and perform an adjustment operation according to an instruction of the controller.

4. A control method of a full hydraulic synchronous steering system, wherein the full hydraulic synchronous steering system is the full hydraulic synchronous steering system according to claim 1, and the control method is performed according to the following steps:
   Step 1: determining a desired steering curve $\gamma$ between a steering wheel angle $\alpha$ and a rear wheel angle $\beta$;
   Step 2: inputting a current steering wheel angle value $\alpha_1$ to the desired steering curve $\gamma$ to obtain a desired rear wheel angle value $\beta_1$ corresponding to the current steering wheel angle value $\alpha_1$;
   Step 3: collecting an actual rear wheel angle value $\beta_2$, and calculating a steering error $|\Delta\beta|=|\beta_2-\beta_1|$;
   Step 4: determining an oil supply status of a steering cylinder; and
   Step 5: performing compensation control of the steering error according to the oil supply status of the steering cylinder.

5. The control method of the full hydraulic synchronous steering system according to claim 4, wherein the desired steering curve γ of Step 1 is further determined according to the following method:
Step 1.1: opening an oil replenishment solenoid valve (5) fully, closing an oil discharge solenoid valve (4) fully, rotating a steering wheel, collecting a steering wheel angle value and a rear wheel angle value, and obtaining a full oil replenishment steering curve $\gamma_3$ between the steering wheel angle α and the rear wheel angle β;
Step 1.2: closing the oil replenishment solenoid valve (5) fully, opening the oil discharge solenoid valve (4) fully, rotating the steering wheel, collecting the steering wheel angle value and the rear wheel angle value, and obtaining a full oil discharge steering curve $\gamma_4$ between the steering wheel angle α and the rear wheel angle β; and
Step 1.3: taking any one of curves within a range of upper and lower limits formed by the full oil replenishment steering curve $\gamma_3$ and the full oil discharge steering curve $\gamma_4$ as the desired steering curve γ between the steering wheel angle α and the rear wheel angle β.

6. The control method of the full hydraulic synchronous steering system according to claim 4, wherein the oil supply status of the steering cylinder of Step 4 is determined according to the following method:
when $|\Delta\beta| > \Delta\beta_{limit}$ and $\Delta\beta < 0$, the steering cylinder is in an oil replenishment status;
when $|\Delta\beta| > \Delta\beta_{limit}$ and $\Delta\beta > 0$, the steering cylinder is in an oil discharge status; and
when $|\Delta\beta| \leq \Delta\beta_{limit}$, the steering cylinder is in a balanced status;
wherein $\Delta\beta_{limit}$ is an allowable error.

7. The control method of the full hydraulic synchronous steering system according to claim 4, wherein the compensation control of the steering error of Step 5 is performed according to the following method:
when the steering cylinder is in an oil replenishment status, opening an oil replenishment solenoid valve (5), closing an oil discharge solenoid valve (4), and performing an oil replenishment operation on the steering cylinder;
when the steering cylinder is in an balanced status, closing the oil replenishment solenoid valve (5) and closing the oil discharge solenoid valve (4) without controlling the steering cylinder; and
when the steering cylinder is in an oil discharge status, closing the oil replenishment solenoid valve (5), opening the oil discharge solenoid valve (4), and performing an oil discharge operation on the steering cylinder.

8. The control method of the full hydraulic synchronous steering system according to claim 4, wherein the desired steering curve γ of Step 1 is determined according to the following method:
Step 1.1: determining a relationship curve $\gamma_1$ between the steering wheel angle α and a stroke L of a push rod of the steering cylinder using formula (1):

$$\alpha = \frac{90\pi \times (D^2 - d^2)}{q_0} \times L \tag{1}$$

in formula (1), $q_0$ is a theoretical single-turn discharge of a hydraulic steering pump; D is an inner diameter of the steering cylinder (7); d is a diameter of the push rod of the steering cylinder (7); and Step 1.2: obtaining according to a characteristic relationship among the push rod of the steering cylinder, a steering knuckle arm and parameters of a steering column, a steering curve $\gamma_2$ between the stroke L of the push rod of the steering cylinder and the rear wheel angle β, and determining, according to the steering curve $\gamma_2$, the desired steering curve γ between the steering wheel angle α and the rear wheel angle β.

* * * * *